(12) United States Patent
Steinich

(10) Patent No.: US 8,601,708 B2
(45) Date of Patent: Dec. 10, 2013

(54) OPERATING METHOD FOR A MEASURING BAND SENSOR

(75) Inventor: Klaus Manfred Steinich, Zorneding/Pöring (DE)

(73) Assignee: ASM Automation Sensorik Messtechnik, Moosinning (DE)

( * ) Notice: Subject to any disclaimer, the term of this patent is extended or adjusted under 35 U.S.C. 154(b) by 103 days.

(21) Appl. No.: 13/283,304

(22) Filed: Oct. 27, 2011

(65) Prior Publication Data

US 2012/0102773 A1    May 3, 2012

(30) Foreign Application Priority Data

Oct. 29, 2010  (DE) .......................... 10 2010 050 041

(51) Int. Cl.
*G01B 3/10*    (2006.01)
(52) U.S. Cl.
USPC .................................. 33/701; 33/755; 33/770

(58) Field of Classification Search
USPC ............................ 33/701, 732, 733, 755, 770
See application file for complete search history.

(56) References Cited

U.S. PATENT DOCUMENTS

| | | | | |
|---|---|---|---|---|
| 2,127,443 | A | 8/1938 | Duncan et al. | |
| 2,974,947 | A * | 3/1961 | Ziegler | 33/755 |
| 6,269,547 | B1 * | 8/2001 | Chuang | 33/733 |
| 6,473,986 | B1 * | 11/2002 | Sun | 33/755 |
| 2012/0047758 | A1 * | 3/2012 | Sander et al. | 33/770 |

* cited by examiner

*Primary Examiner* — G. Bradley Bennett
(74) *Attorney, Agent, or Firm* — Head, Johnson & Kachigian, P.C.

(57) ABSTRACT

In order to be able to deflect a free end of a measuring band of a measuring band sensor not only in a direction transversal to an inlet plane according to the invention the free end of the measuring band 3 arranged outside of the housing is twisted about its longitudinal axis by 90° at the most. This facilitates deflections of a total of 180°. When a deflection within the remaining 180° shall be facilitated, a torsion of the free end of the measuring band also has to be provided by 90°, but in the other direction with respect to the inlet plane.

8 Claims, 2 Drawing Sheets

Figure 3A:
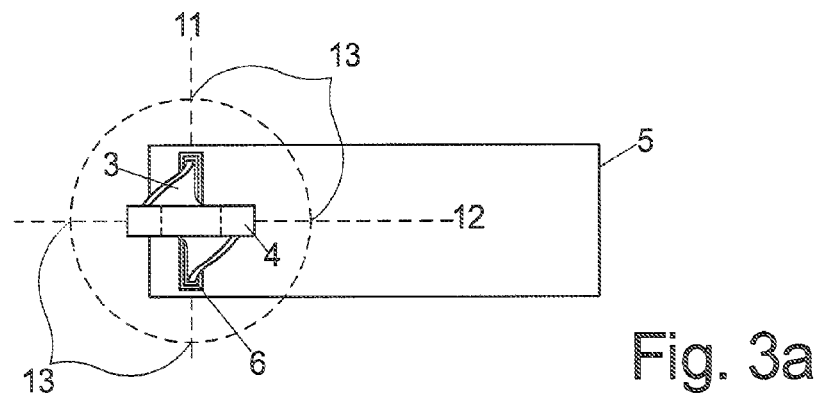

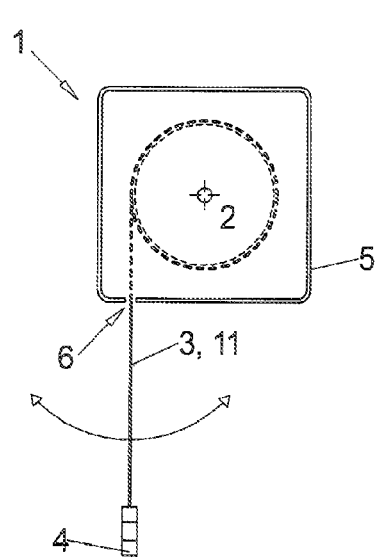
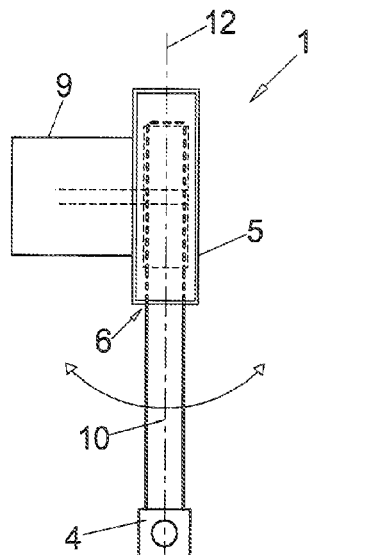
Fig. 1a
Prior Art
Fig. 1b
Prior Art
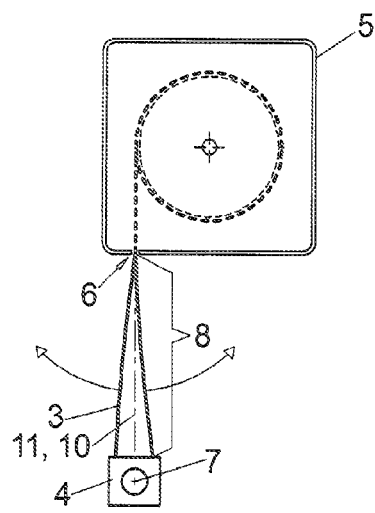
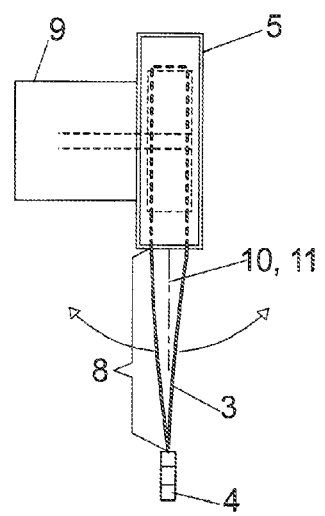
Fig. 2a
Fig. 2b

US 8,601,708 B2

OPERATING METHOD FOR A MEASURING BAND SENSOR

I. FIELD OF THE INVENTION

Measuring cable sensors and measuring band sensors are known for measuring a position of a movable object from a fixed point, wherein the measuring cable or the measuring band is attached with one end on a circumference of a winding drum which is preloaded e.g. through a spring in wind up direction.

A free end of the measuring cable or the measuring band typically configured as attachment eyelet is always arranged outside of the housing which envelops at least the winding drum and into which the measuring cable or the measuring band reaches through an inlet opening.

Since an angle sensor is coupled rotationally fixated with the winding drum, the attachment eyelet at a free end of the measuring cable or measuring band is connected with the attachment point that is moving and which shall be detected with respect to its position so that a measurement is being performed by the rotation angle sensor while pulling off the measuring cable and the measurement is computed into a pull-off length of the measuring cable or measuring band and put out as a measuring value.

II. BACKGROUND OF THE INVENTION

It is an advantage of the measuring cable that it can be deflected by substantial deflection angles in the portion outside of the inlet opening from the inlet opening into all transversal directions, thus the attachment point does not have to be exactly in line with the exit direction.

It is an advantage of a measuring band that it has a higher service life than a measuring cable, however, outside of the inlet opening it can only be deflected in a plane that is defined by the radial plane of the winding drum, but not transversal thereto.

III. DETAILED DESCRIPTION OF THE INVENTION a) Technical Object

Therefore it is an object of the invention to use a known measuring band sensor of the type recited supra so that the described disadvantage is overcome without having to let go of the advantages of a measuring band sensor.

b) Solution

Rotating the measuring band in a portion outside of the housing generates sections of the measuring band which are arranged with a large extension of its rectangular cross-section precisely rectangular to the radial plane of the winding drum, namely the portion of the measuring band which is arranged directly outside of the inlet opening, since the inlet opening is typically closely sized with respect to the measuring band and keeps its cross-section exactly orthogonal to the radial plane of the winding drum.

When the rotation angle of the free end, thus of the attachment eyelet, of the measuring band is at least 90 degrees, there is a section of the measuring band outside of the housing in which the large extension of the cross-section is exactly in a direction of the radial plane of the winding drum. When the rotation angle is exactly 90° this is the free end of the measuring cable.

When the rotation angle is greater than 90°, this area is the further away from the free end, the greater the rotation angle was.

Since a rotation of more than 90° does not improve the desired effect any further but additionally loads the measuring band through increasing torsion, ideally a rotation of exactly 90° will be selected unless installation conditions require a greater rotation angle.

For a rotation angle of less than 90 degrees, there is no portion of the measuring band where its cross-section is in the radial plane so that the movement options of the free outer portion of the measuring bands are limited thereby since deflections can only be provided in directions which are orthogonal to the large extension orientation of the cross-sectional surface of a section or point of the measuring band outside of the inlet opening.

In order for the measuring cable not to be damaged through the forced torsion when moving into the wound up condition, a predetermined length of the measuring band within which the torsion is provided must not be undercut.

For this purpose the measuring band sensor has to be sufficiently far away from the attachment point whose position shall be detected and which is connected with the attachment eyelet of the free end of the measuring band also in the condition that is most proximal to the measuring band sensor a sufficient free-length between the attachment eyelet of the measuring band and the inlet opening into the housing of the band sensor has to remain.

How big this minimum length has to be certainly depends from the width and thickness of the measuring band and its elasticity. Typically the measuring band is made from steel, in particular spring steel.

In particular in this case, the free minimum length should at least be five times, better ten times the width of the measuring band and/or at least 100 times, better 200 times the thickness of the measuring band.

c) EMBODIMENTS

An embodiment of the invention is subsequently described in an exemplary manner with reference to drawing figures, wherein:

FIGS. 1a, b: illustrates a measuring band sensor in a prior art application;

FIGS. 2a, b: illustrates a measuring band sensor in an application according to the invention;

FIGS. 3a, b: illustrates views of a free end of the measuring band in a direction of the longitudinal axis of the measuring band.

FIG. 1 illustrate a prior art measuring band sensor 1 in a lateral view and in a frontal view in which a measuring band 3 is wound in plural layers on top of one another on a winding drum 2 in a housing 5, wherein the measuring band extends out of the housing 5 with its free end portion through an inlet opening 6.

The free end of the measuring band 3 is typically provided with an attachment eyelet 4 which is used for fixating at an attachment point 7, whose variable position relative to the measuring band sensor 1 shall be detected.

For this purpose the measuring band sensor 1 is mounted fixated in location. The pull-off length of the measuring band 3 is measured by the winding drum 2 through a rotation angle sensor 9 which is connected torque proof with the winding drum 2 and is typically arranged outside on the housing 5. Thus, the winding drum 2 is preloaded in wind-up direction through a spring that is arranged e.g. in the interior of the winding drum and not illustrated.

The measuring band 3 always remains in the same orientation with its cross-section, wherein the measuring band has the same orientation when passing through the inlet opening 6, so that the pulled off free end of the measuring band 3 is arranged in the inlet plane 11 defined by the slot shaped inlet opening 6 and the pulled off portion of the measuring band 3 that is still within the housing 5.

On the other hand side the plane that is orthogonal to the rotation axis of the winding drum 2 is designated as radial plane 12.

As apparent from FIGS. 1a and 1b, deflecting the measuring band 3 in its portion outside of the housing 5 is only feasible in a direction transversal to its main plane as illustrated in FIG. 1a, but not in its main plane as illustrated in FIG. 1b.

Since in many applications deflections of the pulled off portion of the measuring band 3 in plural directions would be desirable, this can be achieved through the method according to the invention in that the portion of the measuring band 3 that is arranged outside of the housing 5, thus the portion between the inlet opening 6 and the free end of the measuring band 3, typically of the attachment eyelet 4 arranged at this location is twisted about the longitudinal axis 10 of the measuring band 3'.

This is performed in the simplest manner through respective rotation of the attachment eyelet 4 since the cross-section of the measuring band 3 is held in its original position in the inlet opening 6 which is only slightly larger than the cross-section of the measuring band 3 since especially here an introduction of to contaminants into the housing shall be avoided.

FIG. 3 illustrate which deflection directions 13 are possible for which torsion angle of the end portion of the measuring band 3 based on the physical fact that the measuring band 3 is only deflectable in directions perpendicular to its main plane.

In FIG. 3 the attachment eyelet 4 was rotated by 90° relative to the inlet plane 11, thus the position of the inlet opening 6.

Since, depending on the position along the measuring band 3 between the inlet opening 6 and the attachment eyelet 4, the orthogonal of the main plane of the measuring band 3 can have all angular positions between the radial plane 12 of the winding drum 2 and the inlet plane 11 of the inlet opening 6, a range of 90° from the radial plane 12 is feasible as possible deflection direction 13 and thus up to the inlet plane 11 and certainly also the directions opposite thereto are possible.

Figure 3B:
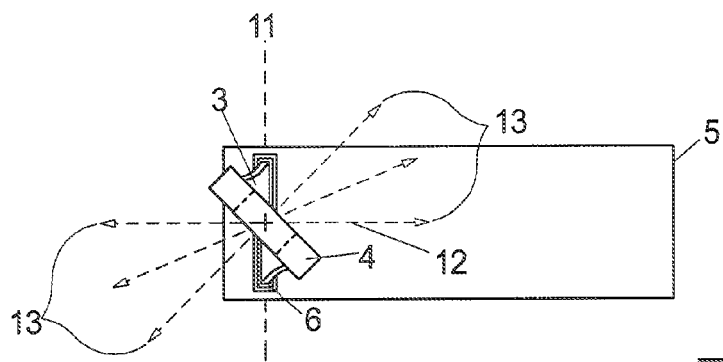

In FIG. 3b, however, the attachment eyelet 4 is only rotated by 45 degrees relative to the inlet plane 11.

Accordingly, only the 45° adjacent to the radial plane 12 are feasible as deflection directions 13 including the respective opposite directions.

FIG. 3 also illustrates in particular that in case of a desired deflection direction from 0° to 90° degrees from the inlet plane 11 counterclockwise, a rotation of the attachment eyelet 4 in the other direction, thus clockwise would be required relative to the inlet plane 11 thus always in a direction so that the orthogonal of the twisted band plane is oriented in the direction of the desired deflection orientations.

It is furthermore apparent from FIGS. 2a and 2b that it is required for a use of the band sensor according to the invention to mount the measuring band sensor 1 far enough away from the attachment point 7 whose position shall be detected.

In the condition of this attachment point 7 being most proximal to the band sensor 1, the remaining distance of the measuring band 3 pulled out of the housing 5 still has to be large enough in order to have the twisting of the measuring band which is provided as a consequence over this distance occur without damages or other disadvantages for the measuring band 3, also over a longer period of time since the twisted rotational position of the eyelet 4 is maintained in all initial stages.

The size of the distance 8 besides depending from the material of the measuring band 3 which is typically spring steel mostly depends from the width and the thickness of the measuring band 3.

REFERENCE NUMERALS AND DESIGNATIONS 1 measuring band sensor
2 winding drum
3 measuring band
4 attachment eyelet
5 housing
6 inlet opening
7 attachment point
8 distance
9 rotation angle sensor
10 longitudinal axis
11 inlet plane
12 radial plane
13 deflection direction

The invention claimed is:

1. A method for using a measuring band sensor (1) including a rotatable wind up drum (2) preloaded in wind up direction on which a measuring band (3) is windable in plural layers on top of one another, whose attachment eyelet (4) at a free end of the measuring band (3) always remains outside of the inlet opening (6) of the housing (5) of the measuring band sensor (1), wherein the measuring band (3) between the attachment eyelet (4) and the inlet opening (6) is rotated about the longitudinal axis (10) of the measuring band (3) through rotating the attachment eyelet (4).

2. The method according to claim 1, wherein rotating the measuring band is provided by at least 30°, better at least 50°, in particular 90°.

3. The method according to claim 1, wherein the distance of the measuring band sensor (1) from a reference point (7) where the attachment eyelet (4) is attached is selected large enough so that a distance of at least five times, better ten times the width of the measuring band (3) remains between the attachment eyelet (4) and the inlet opening (6) in maximally wound up condition.

4. The method according to claim 1, wherein the distance of the measuring band sensor (1) from the attachment point (7) where the attachment eyelet (4) is attached is selected large enough so that a distance (8) of at least 100 times, better 200 times the thickness of the measuring band (3) remains in maximum wound up condition between the attachment eyelet (4) and the inlet opening (6).

5. The method according to claim 2, wherein the distance of the measuring band sensor (1) from a reference point (7) where the attachment eyelet (4) is attached is selected large enough so that a distance of at least five times, better ten times the width of the measuring band (3) remains between the attachment eyelet (4) and the inlet opening (6) in maximally wound up condition.

6. The method according to claim 2, wherein the distance of the measuring band sensor (1) from the attachment point (7) where the attachment eyelet (4) is attached is selected large enough so that a distance (8) of at least 100 times, better 200 times the thickness of the measuring band (3) remains in maximum wound up condition between the attachment eyelet (4) and the inlet opening (6).

7. The method according to claim 3, wherein the distance of the measuring band sensor (1) from the attachment point (7) where the attachment eyelet (4) is attached is selected large enough so that a distance (8) of at least 100 times, better 200 times the thickness of the measuring band (3) remains in maximum wound up condition between the attachment eyelet (4) and the inlet opening (6).

8. A method for using a measuring band sensor, which method comprises:
- preloading a rotatable wind up drum (2) in a wind up direction by winding a measuring band (3) in plural layers on top of one another;
- connecting an attachment eyelet (4) at a free end of the measuring band (3) so that the attachment eyelet (4) always remains outside of an eyelet opening (6) of a housing (5) of the measuring band sensor (1); and
- rotating the measuring band (3) between the attachment eyelet (4) and the inlet opening (6) about a longitudinal axis (10) of the measuring band (3) by rotating the attachment eyelet (4).

* * * * *